Figure 1:
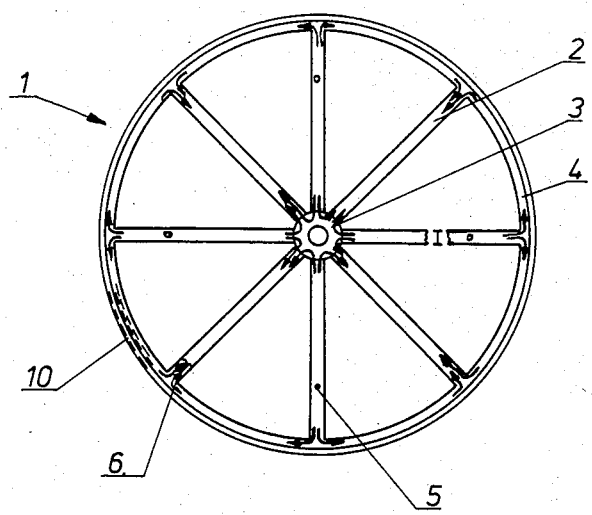

United States Patent [19]

Schauf et al.

[11] Patent Number: 4,511,184
[45] Date of Patent: Apr. 16, 1985

[54] PLASTIC WHEEL

[75] Inventors: Dieter Schauf, Leichlingen; Klaus Protoschill; Karl Oberbach, both of Bergisch-Gladbach; Hans-Werner Depcik, Duesseldorf, all of Fed. Rep. of Germany

[73] Assignee: Bayer Aktiengesellschaft, Fed. Rep. of Germany

[21] Appl. No.: 408,762

[22] Filed: Aug. 17, 1982

[30] Foreign Application Priority Data

Aug. 29, 1981 [DE] Fed. Rep. of Germany ....... 3134249

[51] Int. Cl.³ .............................................. B60B 5/02
[52] U.S. Cl. ............................ 301/63 PW; 301/64 R; 264/328.12; 264/257
[58] Field of Search .......... 301/63 PW, 64 R, 64 SD, 301/66; 74/552; 264/328.3, 328.8, 328.12, 257

[56] References Cited

U.S. PATENT DOCUMENTS

| 3,452,798 | 7/1969  | Ravreby          | 301/63 PW  |
|-----------|---------|------------------|------------|
| 3,604,756 | 9/1971  | Gruber           | 301/63 PW  |
| 3,695,729 | 10/1972 | Schwerdhofer     | 301/64 R   |
| 3,843,202 | 10/1974 | Lacerte          | 301/63 PW  |
| 3,880,978 | 4/1975  | Aposteleris et al. | 264/328.12 |
| 3,917,352 | 11/1975 | Gageby           | 301/63 PW  |
| 3,952,786 | 4/1976  | Kreling et al.   | 301/63 PW  |
| 4,276,346 | 6/1981  | Bramwell         | 264/257    |
| 4,280,736 | 7/1981  | Raudman          | 301/63 PW  |
| 4,294,490 | 10/1981 | Woelfel          | 301/63 PW  |

FOREIGN PATENT DOCUMENTS

| 278896  | 11/1964 | Australia ............ 301/63 PW     |
| 0051996 | 5/1982  | European Pat. Off. ...... 301/63 PW  |
| 1955568 | 5/1971  | Fed. Rep. of Germany ........ 301/63 PW |
| 2091651 | 8/1982  | United Kingdom .......... 301/63 PW  |
| 2093778 | 9/1982  | United Kingdom .......... 301/63 PW  |

Primary Examiner—Robert B. Reeves
Assistant Examiner—Russell D. Stormer
Attorney, Agent, or Firm—Connolly and Hutz

[57] ABSTRACT

A unitary wheel is injection molded from reinforced thermoplastic material in such a manner that the melt streams of material meet and coalesce in the spokes of the wheel. This wheel has improved strength since the melt streams do not meet and coalesce in the rim portion thereby making the rim impact resistant. Coalescence of the melt streams in the spokes of the wheel is accomplished by introducing the streams into certain of the spokes while separating those spokes from each other by an odd number of intermediary spokes to which no material is directly injected.

1 Claim, 3 Drawing Figures

U.S. Patent    Apr. 16, 1985    4,511,184

PLASTIC WHEEL

The invention relates to a plastics wheel consisting of rims, spokes and a hub.

A small-diameter spoked wheel of glass-fibre-reinforced plastics material having an odd number of spokes is already known, its hub being formed by extrusion.

The disadvantage of this known spoked wheel lies in the fact that, due to the coalescence of the melt streams in the rim, the strength of the material is weakened therein, resulting in destruction of the rim, particularly in the event of impact.

An object of the present invention is to provide a plastics spoked wheel which enables the material properties to be fully utilised in the event of mechanical stressing, particularly when the rim impacts against a raised object such as a curbstone. The wheel has good true-running properties and can be made in a single operation.

According to the invention, this object is achieved in that the rim which comprises peripherally directed reinforcing elements is held by an even number of spokes.

With this plastics wheel, which in contrast to previous expert opinion is provided with an even number of spokes, a high degree of true running is achieved because a material structure which is uniform over the entire periphery and which satisfies the most stringent requirements with regard to strength is obtained by the reinforcing element which may consist of mineral fibres and which are preferably oriented in the peripheral direction of the wheel. This effect may of course also be achieved with polymers which form a liquid-crystalline melt. So far as strength properties are concerned, the values thus obtained can increase to between five and six fold in the event of impact stressing such as occurs when the rim impacts a raised object such as a curbstone. The critical flow lines of the melt streams may be situated in the vicinity of the reinforcements, such as spokes or overlaps. Injection moulding using thermoplasts provides for high strength construction of the load-bearing parts at no significant extra cost so that it is also possible, in particular, to make large-diameter plastics wheels (26", 28" and larger).

In one particular embodiment, the rim is provided with a tension member in the form of reinforcing elements arranged along the periphery.

The tension member, which may consist of a roving, wire, non-woven and/or woven fabric of metal, plastics (aromat. PA, polyimide), textile, carbon or mineral-based materials, for example glass, provides the plastics wheel with additional peripheral strength which is of advantage in the event of relatively heavy stressing and in the case of lightweight construction.

In another embodiment, the spokes are made flexible so as to cushion the rim when it impacts against a raised object.

By virtue of spokes curved in the plane of the wheel and by variation of the cross-sections, the level of flexibility or springiness may be predetermined within wide limits, enabling a more comfortable ride to be achieved through the true-running rim.

In one process for producing the plastics wheel, the melt streams are injected at individual spokes and are guided in such a way that they coalesce in the odd number of intermediate spokes arranged on the rim.

If the quotient between the number of spokes and the number of injection points is an even number, the flow lines are situated as required in the head, central or foot zone providing appropriate flow resistances were established in advance in the spokes so that in the tension-free rim the reinforcing elements are automatically oriented preferentially tangentially in the peripheral direction with the result that the required strength is achieved there. The deflection of the rim reinforcing elements in the region of the spokes is not noticeable from the strength point of view because of the reinforcement in the direction of the hub (spoke).

Plastics which have proved to be particularly effective are glass-fibre-reinforced thermoplastically processible polyamide moulding compositions consisting of:

A: PA 6, PA 6,6, copolyamides or mixtures thereof having intrinsic viscosities of from 2.5 to 3.5 dl/g and preferably from 2.7 to 3.0 dl/g, as measured in m-cresol,
B: an elasticiser,
C: a fibrous reinforcing material.

Good results have also been obtained with glass-fibre-reinforced, thermoplastically processible polyester moulding compositions consisting of:

A: a thermoplastic resin phase,
B: an elasticiser,
C: a fibrous reinforcing material.

75 to 100% and preferably 80 to 95% of the resin phase A consists of polyalkylene terephthalate and 25 to 0% and preferably 20 to 5% of aromatic polycarbonate.

In the context of the invention, polyalkylene terephthalate is understood to include PBTP or PETP, copolyesters based on PBTP or PETP and also mixtures of these polyesters in any ratio having intrinsic viscosities of from 0.60 to 1.20 dl/g, as measured in a solvent mixture of 50 parts of phenol and 50 parts of 1,2-dichlorobenzene. The aromatic polycarbonate is preferably a bisphenol-A-polycarbonate having intrinsic viscosities of from 0.45 to 0.55 dl/g, as measured in methylene chloride.

The above-mentioned products are high-impact modified by suitable elastomers in quantities of from 1 to 25% and preferably in quantities of from 5 to 20%, based on the mixture of A and B. "Suitable elastomers" are understood to be high-impact modifiers dispersed in the resin phase A in the form of discrete particles having a particle size of from 0.1 to 0.6 μm and preferably from 0.2 to 0.5 μm.

The products contain fibrous reinforcing materials, preferably mineral fibrous products, such as glass fibres for example, having an L/D-ratio of from 10:1 to 50:1 in a quantity of from 10 to 50% and preferably in a quantity of from 20 to 40%, based on the total mixture of A+B+C.

Figure 2:
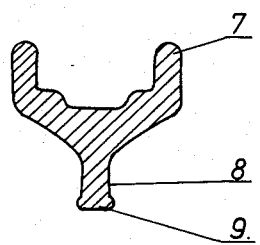
Figure 3:
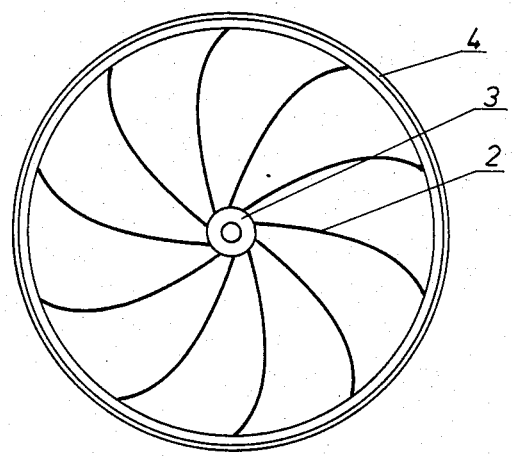

Examples of the invention are described in detail in the following with reference to the accompanying drawings, wherein:

FIG. 1 is an elevation of an 8-spoke plastics wheel.
FIG. 2 is a cross-section through the rim.
FIG. 3 is an elevation of a wheel with springy spokes.

FIG. 1 shows a plastics wheel 1 comprising eight I-shaped spokes 2 which are joined in the middle to a hub 3 and externally to a rim 4. Injection points 5 are arranged in the ratio: number of spokes 2 divided by the number of injection points 5, which gives an even number. The flow line 6 of the melt streams lies in the region within the spokes 2, optionally in the overlap (not shown). Tension members in the form of reinforcing elements 10 may be provided along the periphery of the rim.

FIG. 2 is a cross-section through the rim 4, flange 7 of the rim increasing in thickness towards the middle commensurate with the increase in stressing. In the plane of symmetry, the flange is adjoined by a co-injected ring 8 with a reinforced base 9, the latter considerably increasing the moment of inertia.

In FIG. 3, the spoke 2 joining the hub 3 and the rim 4 is curved so that under load the rim yields to cushion the load.

The arrangement of the injection points 5 is such that all of the melt streams meet and coalesce in the intermediary spokes located between those spokes having the injection points. With a wheel having an even number of spokes, this is accomplished by providing an odd number of intermediary spokes between the ones having the injection points. For example, if the wheel has sixteen spokes and two spokes each have an injection point, then seven intermediary spokes are located on either side of each of the other two spokes. Similarly, with sixteen total spokes and four having an injection point, three intermediary spokes are located between those spokes having an injection point. Further, with sixteen total spokes and eight having an injection point, one intermediary spoke is provided. In each instance of the example, spokes having the injection points are spaced from one another by an odd number (1, 3, or 7) of spokes without injection points. FIG. 1 illustrates this relationship and the meeting and coalescing of the melt streams only in the spokes and not in the rim.

We claim:

1. A process for producing an injection molded unitary wheel having an even number of spokes interconnecting a rim and hub, the process comprising the steps of providing a wheel mold having rim and hub forming portions and an even number of spoke forming portions, locating one injection point in each of some of the spoke forming portions of the mold, separating the spoke forming portions of the mold having injection points from each other by an odd number of intermediary spoke forming mold portions without injection points, and injecting a melt stream into each of the injection points whereby all of the streams meet and coalesce in the intermediary spoke forming mold portions.

* * * * *